United States Patent Office

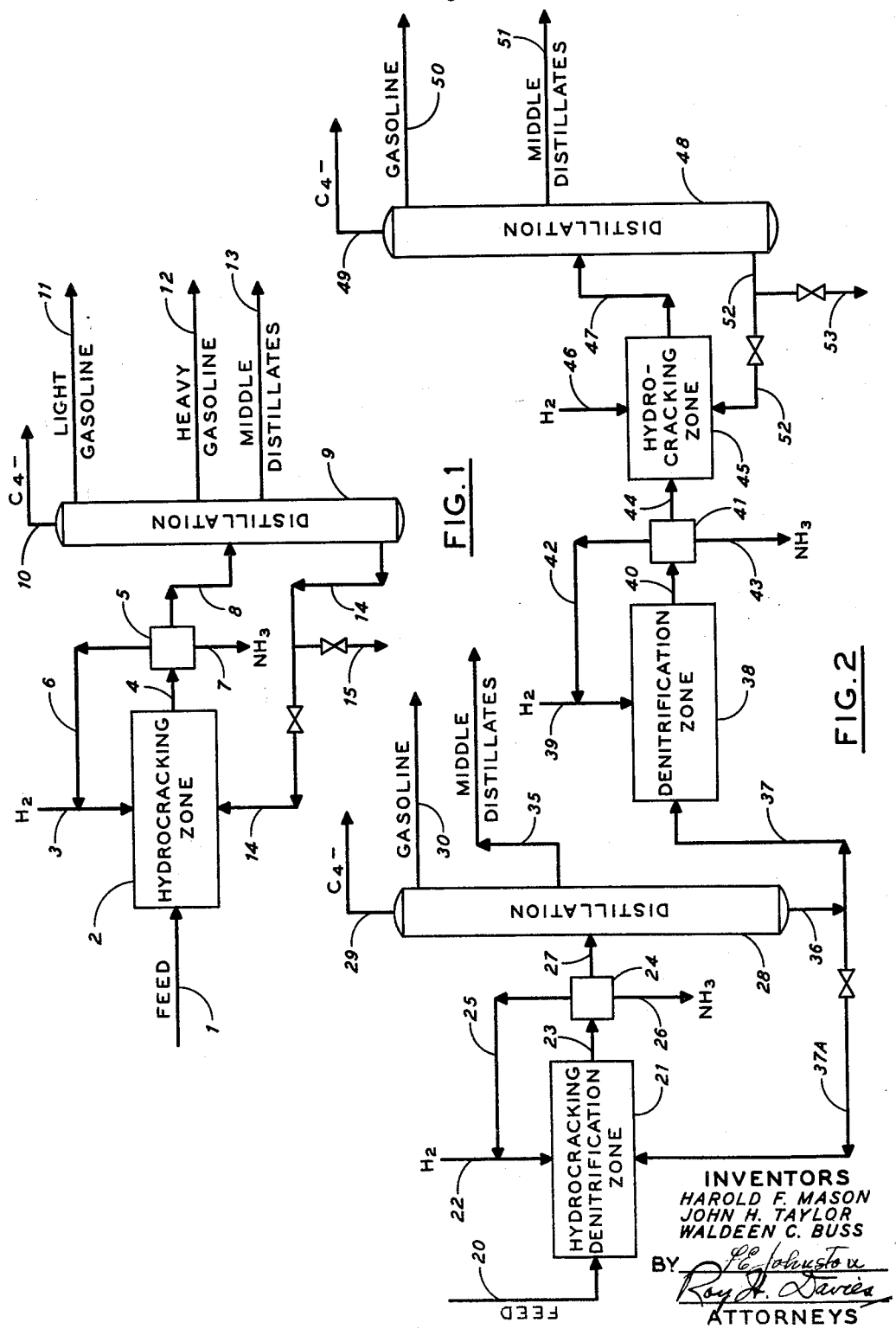

3,172,838
Patented Mar. 9, 1965

3,172,838
HYDROCARBON CONVERSION PROCESS AND
CATALYST
Harold F. Mason, Berkeley, John H. Taylor, Corte
Madera, and Waldeen C. Buss, Pinole, Calif., assignors
to California Research Corporation, San Francisco,
Calif., a corporation of Delaware
Filed Aug. 3, 1962, Ser. No. 214,726
6 Claims. (Cl. 208—61)

INTRODUCTION

This invention relates to a hydrocarbon conversion process, more particularly to a hydrocarbon conversion process for converting petroleum distillates and residua into various valuable products, and still more particularly to a catalytic conversion process capable of producing a high ratio of middle distillates to gasoline and further capable of producing middle distillates and gasoline in widely varying ratios to meet demand fluctuations resulting from seasonal or other causes.

PRIOR ART HYDROCRACKING OF HYDROCARBON FEEDS TO PRODUCE MIDDLE DISTILLATES AND GASOLINE, AND PROBLEMS INVOLVED

A. Nitrogen content of feed: It is well known that nitrogen in a hydrocarbon feed is deleterious to certain hydrocracking catalysts, particularly highly acidic hydrocracking catalysts, and that, in order to provide a practical process for producing middle distillates from a feed containing substantial amounts of nitrogen, a catalyst having no more than weak acidity has been necessary, so that the deleterious effect of nitrogen on the catalyst would be minimized. However, catalysts having no more than weak acidity have required relatively high starting temperatures in order to produce the desired middle distillate products at reasonable conversions.

B. Supports and hydrogenation components: Heretofore, silica-alumina has been regarded as the conventional hydrocracking catalyst support, and has been used in combination with various hydrogenation components. However, there has been a need for other catalyst supports and unique combinations therewith of hydrogenation components that would be relatively nitrogen insensitive and that would provide reasonable conversions of feed to valuable products including middle distillates, at fouling rates at least as low, and preferably lower than those obtained with conventional hydrocracking catalysts.

C. Ratio of iso-$C_4$ to normal-$C_4$ product: It is well known that a high iso-$C_4$ to normal-$C_4$ product from a hydrocracking zone is highly desirable. Isobutane, for example, is a valuable product for use in motor gasoline blending, whereas normal butane is less valuable. A low iso-$C_4$ to normal-$C_4$ product ratio has been a disadvantage of many prior art processes.

D. Ratio of middle distillate product to gasoline product: It is well known that a relatively high ratio of middle distillate to gasoline product may be obtained with certain prior art hydrocracking catalysts, particularly with hydrocracking catalysts having no more than weak acidity; however, this high ratio generally has been obtained at the expense of a high operating temperature, and particularly a high starting temperature.

E. Starting temperatures necessary for reasonable per-pass conversions: It is also known that reasonable per-pass conversions are obtainable with prior art catalysts, but that, in order to obtain these per-pass conversions, certain minimum starting temperatures are required, and it would be desirable if a catalyst were available that would give the same results at lower starting temperatures.

F. Paraffinicity of unconverted bottoms fraction recycled to reactor: It is well known that various prior art catalysts, particularly catalysts of extremely low activity which are useful in the production of middle distillates and catalysts of extremely high activity which are useful in the production of gasoline, produce an unconverted bottoms fraction having a high content of normal paraffins. It is known that these normal paraffins are deleterious to the hydrocracking operation because they are extremely refractory to further hydrocracking and therefore, particularly where high middle distillate production is desired, as a practical matter cannot be recycled. It would be desirable if a catalyst were available that could produce large quantities of middle distillates without producing a bottoms product of prohibitively high normal paraffin content.

G. Regeneration: It is known that many prior art hydrocracking catalysts lose a great deal of their fresh catalyst activity upon regeneration, and it would be very desirable if a catalyst were available that would meet the foregoing prior art problems, that it also be regenerable.

OBJECTS

In view of the foregoing, it is an object of the invention to provide a catalyst comprising a novel combination of support and hydrogenation components, and a process using said catalyst, capable of converting both hydrocarbon feed stocks that have a high nitrogen content and those that have been denitrified, to produce middle distillates and gasoline at a high ratio of middle distillate to gasoline and at reasonable starting and operating temperatures.

It is a further object of the present invention to provide such a catalyst and process capable of producing a high ratio of iso-$C_4$ to normal-$C_4$ product.

It is a further object of the present invention to provide such a process and catalyst wherein the unconverted bottoms fraction has a sufficiently low content of normal paraffins to permit recycling this fraction to the reactor in sustained recycle operation.

It is a further object of the present invention to provide such a catalyst and process wherein the catalyst may be regenerated to reimpart to it a substantial portion of its original fresh activity.

DRAWINGS

The invention will best be understood, and further objects and advantages thereof will be apparent, from the following description when read in conjunction with the accompanying drawings, in which:

FIG. 1 is a diagrammatic illustration of process units and flow paths suitable for carrying out the process of the present invention in one or two hydrocracking stages; and FIG. 2 is a diagrammatic illustration of process units and flow paths suitable for carrying out the process of the present invention in three stages, wherein hydrocracking and denitrification are accomplished in the first stage, denitrification of a portion of the first stage effluent is accomplished in a second stage, and the effluent from the second stage is hydrocracked in a third stage.

STATEMENT OF INVENTION

In accordance with the present invention, there is provided a process for converting a nitrogen-containing hydrocarbon feed selected from the group consisting of petroleum distillates boiling from 500° to 1100° F. and petroleum residua boiling above 500° F. which comprises concurrently hydrofining and hydrocracking said feed by contacting said feed in a first stage in the presence of from 1000 to 10,000 s.c.f. of hydrogen per barrel of said feed and in the presence of a catalyst comprising at least one hydrogenating component selected from the group consisting of Group VI metals and compounds thereof and at least one hydrogenating component selected from the group consisting of Group VIII metals and compounds thereof and a silica-magnesia catalyst support at a temperature of 500° to 950° F., a hydrogen partial pressure from 1000 to 2500 p.s.i.g. and an LHSV of from 0.1 to 4.0, withdrawing from the effluent from said first stage a gasoline product and ammonia, and hydrocracking in a second stage in the presence of an active acidic hydrocracking catalyst at least a substantial portion of the liquid effluent from said first stage, to produce additional quantities of gasoline having a high ratio of isoparaffins to normal paraffins.

Further in accordance with the present invention, there is provided a process for converting a nitrogen-containing hydrocarbon feed selected from the group consisting of petroleum distillates boiling from 500° to 1100° F. and petroleum residua boiling above 500° F. which comprises contacting said feed in a first stage in the presence of from 1000 to 10,000 s.c.f. of hydrogen per barrel of said feed and in the presence of a catalyst comprising at least one hydrogenating component selected from the group consisting of Group VI metals and compounds thereof and at least one hydrogenating component selected from the Group VIII metals and compounds thereof and a silica-magnesia support at a temperature of from 500° to 950° F., a hydrogen partial pressure from 1000 to 2500 p.s.i.g. and an LHSV of from 0.1 to 4.0, recovering a gasoline product from said first stage, and catalytically cracking in a second stage in the presence of a conventional catalytic cracking catalyst at least a substantial portion of the liquid effluent from said first stage, to produce additional quantities of gasoline.

Still further in accordance with the present invention, there is provided a process as aforesaid wherein at least two reactors are used, each containing said catalyst, and wherein said reactors are so arranged that they can be switched from parallel, for maximizing middle distillate production, to series, for maximizing either gasoline or middle distillate production, whereby the ratio of middle distillate product to gasoline product can be varied.

HYDROCARBON FEEDS SUITABLE FOR USE IN THE PROCESS OF THE PRESENT INVENTION

Suitable feeds for use in the process of the present invention are petroleum distillates boiling from 200° to 1100° F., preferably petroleum distillates boiling from 500° to 1100° F., and petroleum residua boiling above 500° F., and mixtures of the foregoing. Heavy gas oils and catalytic cycle oils are excellent feeds to the process as well as conventional FCC feeds and portions thereof. Residual feeds may include Minas and other paraffinic-type residua.

Particularly when it is desired to produce middle distillates, including jet fuels, which are exceptionally high in naphthene content and low in aromatic content (therefore having high smoke points) and low in normal paraffin content (therefore having low freeze points), it is preferable to use a feed in the process of the present invention which has an initial boiling point of 500° F. or above. Where the feed has an initial boiling point above 500° F., it is converted in the process of the present invention directly to a synthetic material, i.e., one boiling below the feed initial boiling point, which is a preferred jet fuel or middle distillate having high naphthene content, now normal paraffin content and therefore low freeze point, and low aromatic content and therefore exceptionally high smoke point. It has been found that feeds having lower initial boiling points, for example around 300° to 400° F., tend to produce excessive quantities of nonsynthetic products having high aromatics contents and therefore exceptionally low smoke points, although the freeze point may be satisfactory. Such a monosynthetic product also tends to have a high pour point.

NITROGEN CONTENT OF FEED IN PROCESS OF THE PRESENT INVENTION

It has been found that the hydrocracking catalyst of the present invention is relatively nitrogen insensitive, compared with conventional acidic hydrocracking catalysts such as nickel sulfide on silica-alumina. Accordingly, the nitrogen content of the feed used in the process of the present invention may be relatively high, and excellent hydrocracking results still may be obtained at reasonable temperatures, without the necessity for rapidly raising the temperature to maintain conversion as is necessary when hydrocracking a high nitrogen content feed over a conventional acidic hydrocracking catalyst such as nickel sulfide on silica-alumina. Although high nitrogen content feeds can be tolerated by the hydrocracking catalyst of the present invention, it will be noted that said catalyst also is an excellent hydrodentrification catalyst, and is efficient in concurrently hydrofining as well as in hydrocracking the feed. Nevertheless, the process of the present invention may be rendered even more efficient if the feed either is low in nitrogen content or first is hydrofined by conventional methods prior to being hydrocracked in accordance with the process of the present invention. And in certain applications conventional hydrofining following the hydrocracking step is desirable; as will be discussed below, in one embodiment of the present invention, wherein very heavy feeds, for example propane deasphalted residua, are used, the feed may be processed in three stages; in the first stage, the feed may be concurrently hydrocracked and denitrified to a large extent, following which a portion of the effluent from the first stage may be further denitrified in a second stage before being hydrocracked in a third stage.

Generally speaking, it is possible to operate the precess of the present invention at slightly lower temperatures when the feed has a low nitrogen content, for example from 0 to 10 p.p.m. total nitrogen, than temperatures that are necessary for the same conversion when the feed has a high nitrogen content, for example from 10 to 1000 p.p.m. total nitrogen. However, even feeds containing considerably higher levels of nitrogen than 1000 p.p.m. total nitrogen may be satisfactorily converted in the process of the present invention to valuable products, contrary to conventional prior art processes wherein acidic hydrocracking catalysts, such as nickel sulfide on silica-alumina, are used. In such conventional processes, it is impossible as a practical matter to use feeds with such high nitrogen contents.

The catalysts of the present invention is capable of concurrently accomplishing both denitrification and hydrocracking. The hydrocracking facilitates the concurrent denitrification because, upon the breaking of carbon-to-carbon bonds, nitrogen is more easily removed. At higher levels of cracking conversion, the nitrogen is more easily removed than at lower levels. At higher levels of cracking conversion, somewhat higher pressures may be desired to counteract catalyst fouling and deactivation.

The nitrogen compounds tend to concentrate in the heavier portions of the feed; accordingly, such heavier portions are more difficult to denitrify. However, it will be noted from the foregoing that such heavier portions also are easier to crack.

OPERATING CONDITIONS

The conversion zone or zones in the process of the present invention which contain the catalyst of the present invention, discussed below, are operated at combinations of conditions selected from within the varying ranges that will produce the desired degree of hydrocracking: a temperature of about 500° to 950° F., preferably 650° to 850° F.; a hydrogen partial pressure of 500 to 3500 p.s.i.g., preferably 1000 to 2500 p.s.i.g.; and an LHSV of about from 0.1 to 4.0, preferably 0.4 to 2.0. The hydrogen flow to each such conversion zone is from 1000 to 10,000 s.c.f. per barrel of feed, and preferably 2500 to 8000 s.c.f. per barrel of feed. The higher hydrogen partial pressures, particularly with unrefined feeds, give lower catalyst fouling rates and therefore for longer catalyst lives it is preferable to operate above 2000 p.s.i.g. In general, the hydrogen partial pressure will depend upon a number of factors, including type of feed stock and nitrogen content thereof, degree of denitrification required, etc.; however, in general, a hydrogen partial pressure of 1000 to 2000 p.s.i.g. is highly desirable if practicable in any given instance.

CATALYST OF PRESENT INVENTION

A. Composition of catalyst: It is essential that the catalyst of the present invention have (a) a silica-magnesia support, and (b) at least two hydrogenating components, at least one of which must be a Group VI metal or compound thereof and at least one of which must be a Group VIII metal or compound thereof. It has been found that, where the catalyst comprises a Group VI metal or compound thereof alone, without a Group VIII metal or compound thereof, the catalyst has an unacceptably low activity. It has been found that, where the catalyst comprises a Group VIII metal or compound thereof alone, without a Group VI metal or compound thereof, the catalyst has an exceptionally high fouling rate. However, where the catalyst comprises at least one Group VIII metal or compound thereof, and also at least one Group VI metal or compound thereof, the catalyst has a high activity and a low fouling rate. The Group VI metals and compounds thereof that may be used include chromium, molybdenum and tungsten and compounds thereof. The Group VIII metals and compounds thereof that may be used include iron, cobalt, nickel, platinum and palladium and compounds thereof. The most preferred catalysts comprise nickel and molybdenum on a silica-magnesia support and nickel and tungsten on a silica-magnesia support, the catalyst in each case preferably being sulfided. The single main preferred catalyst which has been found to have the most outstanding qualities in the process of the present invention comprises nickel and tungsten on silica-magnesia, preferably sulfided. The Group VI metal or compounds thereof may be present in the catalyst in an amount from 1 to 40 weight percent, preferably from 2 to 25 weight percent, based on the total catalyst composite; the Group VIII metal or compound thereof may be present in an amount from 1 to 20 weight percent, preferably from 2 to 12 weight percent, based on the total catalyst composite. The magnesia content of the silica-magnesia support may range from 5 to 75 weight percent, preferably from 15 to 50 weight percent, and still more preferably from 20 to 35 weight percent.

B. Preparation of catalyst: The silica-magnesia support of the catalyst can be prepared by any conventional method, and the plurality of hydrogenating components may be incorporated in the catalyst by any conventional method. A particularly effective method for preparing the catalyst is set forth in the following example.

Example 1

A powdery silica-magnesia material containing about 28% magnesia was compressed, together with about 5% by weight of a conventional glue-type bonding material used in catalyst preparation, into $3/16'' \times 3/16''$ pellets, and was calcined in air at 950° F. for six hours.

1000 ccs. of the aforesaid calcined material were impregnated for four hours with 800 ccs. of a solution of nickel nitrate containing 11.2% nickel, and the impregnated material was dried for 24 hours at 250° F. and then calcined for four hours at 900° F. The resulting product was a catalyst support containing 9.43% nickel.

The aforesaid catalyst support was impregnated three times with separate 800 cc. portions of a solution consisting of 960 g. of tungstic acid ($H_2WO_4$) dissolved in a mixture of 1152 cc. of 30% ammonia ($NH_3$) and 3460 cc. of water. After each of the aforesaid impregnation treatments, the impregnated composite was dried at 250° F. for 20 hours, and calcined at 900° F. for four hours. The catalyst resulting from the foregoing operations contained 7.02 weight percent nickel and 19.3 weight percent tungsten, and had a nitrogen surface area of 316 m.$^2$/g.

C. Sulfiding the catalyst: Although the catalyst of the present invention may be used in the unsulfided form, the sulfided form is preferable. With feeds containing any substantial amounts of sulfur compounds, the catalyst automatically will tend to become sulfided on the surface under the operating conditions of the process. It is somewhat more preferable to presulfide the catalyst before placing it on-stream and such sulfiding may be accomplished by any conventional method.

D. Regeneration of the catalyst: It is an outstanding advantage of the catalyst of the present invention that it may be regenerated, particularly in view of the difficulties that have been met by the art in the regeneration of many prior art catalysts. While regeneration may be accomplished by any conventional methods, and while the relative effectiveness of such methods may be readily determined by those skilled in the art, the regeneration method set forth in Table IV below is a highly effective one.

E. Preferred catalysts: The preferred catalysts for use in the process of the present invention are set forth above.

F. Activity of catalyst for denitrification: The catalyst of the present invention is a denitrification catalyst, as well as a hydrocracking catalyst, and in the process of the present invention performs both functions under the conditions of the process. The catalyst has excellent denitrification activity, but it is relatively insensitive to nitrogen, and is highly insensitive to nitrogen compared with a conventional acidic hydrocracking catalyst such as nickel sulfide on silica-alumina.

Not only are a plurality of hydrogenating components, at least one of which must be a Group IV metal or compound thereof and at least one of which must be a Group VIII metal or compound thereof, essential to the hydrocracking activity of the catalyst of the present invention, but this same plurality of hydrogenation components is essential to the denitrification activity of the catalyst of the present invention. For example, the preferred nickel-tungsten on silica-magnesia catalyst of the present invention would not have good denitrification activity if only nickel or only tungsten were present; single hydrogenating components, for example molybdenum or tungsten from Group VI or nickel or cobalt from Group VIII, are relatively ineffective for denitrification when not accompanied by a hydrogenating component from the other one of the two groups. Further information regarding the denitrification activity of the catalyst is set forth in Table V below.

G. Selectivity of catalyst for middle distillate production: The catalyst of the present invention has a high selectivity for the production of middle distillates from various hydrocarbon feeds. It has a much greater selectivity for the production of middle distillates than conventional acidic hydrocracking catalysts, such as nickel sulfide on silica-alumina. The high yields of middle distillates resulting from the selectivity of the catalyst of the present invention for middle distillate product is unexpected in view of the selectivity for gasoline production that is characteristic of many prior art hydrocracking catalysts, for example nickel sulfide on silica-alumina. Further information regarding the selectivity of the present invention catalyst for the production of middle distillates is set forth in Table III below.

DESCRIPTION OF PROCESS FLOW ARRANGEMENTS SUITABLE FOR CARRYING OUT THE PROCESS OF THE PRESENT INVENTION

Referring now to FIG. 1, there shown is a diagrammatic illustration of an embodiment of process units and flow paths suitable for carrying out the process of the present invention in a single stage.

A hydrocarbon feed is passed through line 1 into contact in hydrocracking zone 2 with the catalyst of the present invention and with hydrogen entering zone 2 through line 3, under the hydrocracking conditions previously discussed. From zone 2 an effluent is passed through line 4 to separation zone 5, from which hydrogen is recycled through line 6, ammonia is withdrawn through line 7 and remaining materials are passed through line 8 to fractionating zone 9. From fractionating zone 9 light hydrocarbon gases are removed through line 10, light gasoline is removed through line 11, heavy gasoline is removed through line 12, and middle distillate products are removed through line 13. From fractionating column 9 a bottoms product may be recycled through line 14 to hydrocracking zone 2. A net bottoms stream may be withdrawn through line 15 if desired.

The hydrocracking zone 2 shown in FIG. 1 may comprise two hydrocracking reactors, each containing the catalyst of the present invention and each operating under the aforesaid process conditions. These two reactors may be arranged in a known manner so that alternately they can be connected in parallel and in series. When connected in parallel, they will operate to maximize middle distillate production, and when switched to series operation they may maximize gasoline or middle distillate production. In series operation, middle distillate production may be maximized by withdrawing middle distillate as a product from the first reactor as well as from the second, for example from an interreactor fractionation zone. In series operation, gasoline production may be maximized by including the middle distillate produced in the first reactor in the feed to the second reactor. In either series arrangement, it is preferred to remove from the system any ammonia produced in the first reactor, rather than permitting it to pass to the second reactor. Such switching arrangements will enable the ratio of middle distillate to gasoline product to be varied in order to achieve further process application flexibility. In series operation to produce gasoline, where ammonia formed in the first reactor has been removed, the second reactor, because it is operating with a feed that has been denitrified in the first reactor, is operable at lower temperatures, thus providing leeway for increase in severity of the operating conditions in the second reactor to increase gasoline production. The resulting gasoline, produced over the catalyst of the present invention, is isoparaffinic and of high quality, in contrast to the normal paraffinic character of gasoline produced over hydrocracking catalysts having weak acidity.

The operational flexibility of the process flow shown in FIG. 1 may be further increased by passing at least a portion of the bottoms product through line 15 and/or at least a portion of the middle distillate product through line 13 to a second hydrocracking zone containing a conventional acidic hydrocracking catalyst, for example nickel sulfide on silica-alumina. Because the catalyst in zone 2 serves as an effective hydrofining catalyst, the materials in lines 13 and 15 are low in nitrogen and therefore are especially suitable for further hydrocracking in the presence of an acidic catalyst. When the second stage, containing an acidic hydrocracking catalyst, is used, further variations in relative yields of middle distillates and gasoline may be obtained by proper control of the operating conditions in each hydrocracking zone. Middle distillate yield may be increased by maximizing the cracking conversion in zone 2 to produce a high yield of middle distillates, and by reducing the net feed to the second hydrocracking stage containing the acidic catalyst, to permit a lower per-pass conversion in said second stage and an increased yield of middle distillates from that stage. A further increase in middle distillate yield from said second stage may be obtained by operating that stage at a high recycle cut point and at a relatively low catalyst temperature. Gasoline production can be maximized by reducing the cracking severity in zone 2 so that it operates primarily as a denitrification unit, and by operating the second zone, containing an acidic hydrocracking catalyst, to maximize gasoline production, for example by recycling to the second stage all products boiling above about 400° F.

Referring now to FIG. 2, there shown as an embodiment of the present invention is a 3-stage process which is especially effective for converting heavy feeds such as residua and propane deasphalted oils. The feed is passed through line 20 into contact in hydrocracking-denitrification zone 21 with hydrogen entering zone 21 through line 22 and with the catalyst of the present invention, under the operating conditions previously set forth. From zone 21, an effluent is passed through line 23 to separation zone 24 from which hydrogen is recycled through line 25, ammonia is withdrawn through line 26, and remaining materials are passed through line 27 to fractionation zone 28. From fractionation zone 28, light hydrocarbon gases are withdrawn through line 29, gasoline is withdrawn through line 30, and middle distillates are withdrawn through line 35. A bottoms product is passed from distillation zone 28 through lines 36 and 37 to denitrification zone 38, together with a portion of the middle distillate material in line 35, if desired. If desired, a portion of the bottoms product in line 36 may be recycled through line 37A to zone 21. Denitrification zone 38 may be operated under conventional denitrification conditions with either the catalyst of the present invention or with any conventional denitrification catalyst. Hydrogen for denitrification zone 38 is supplied through line 39. From zone 38 an effluent is passed through line 40 to separator 41, from which hydrogen is recycled through line 42, ammonia is withdrawn through line 43, and the remaining materials are passed through line 44 to hydrocracking zone 45. Hydrocracking zone 45 may contain a conventional hydrocracking catalyst, for example nickel sulfide on silica-alumina, and may operate under conventional hydrocracking conditions, for example a pressure of from 500 to 3000 p.s.i.g., and a temperature of from 550° to 850° F. Hydrocracking zone 45 is supplied with hydrogen through line 46. Zone 45 effluent is passed through line 47 to separation zone 48. From zone 48 light hydrocarbon gases are withdrawn through line 49, gasoline is withdrawn through line 50 and middle distillate product through line 51. A bottoms material may be recycled to hydrocracking zone 45 through line 52. An end bottoms stream may be withdrawn if desired.

The aforesaid three-stage process enables the heavy feed to be hydrocracked and partially denitrified in the first stage, thereby reducing both the molecular weight and the nitrogen level of the feed. Denitrification in the first stage greatly accelerates the rate of the remaining denitrification to be accomplished in the second zone, i.e., in zone 38. The overall combination of three stages permits a feed conversion which would not be obtainable as a practical matter with only two stages.

COMPARISON OF CATALYST OF PRESENT INVENTION WITH CONVENTIONAL CATALYSTS RE STARTING TEMPERATURES AND FOULING RATES

The following table sets forth on a comparative basis single stage hydrocracking results of processing a 650° to 980° F. heavy Arabian gas oil having a total nitrogen content of 660 to 700 p.p.m. at the indicated average catalyst temperature, about 50 to 55 volume percent substantially constant per-pass conversion to products boiling below the initial boiling point of the feed, 1.0 LHSV, 2000 p.s.i.g. and a hydrogen rate sufficient to permit withdrawal from the hydrocracking zone of 4500 s.c.f. of hydrogen per barrel of feed, over the catalyst of the present invention compared with hydrocracking the same feed under the same conditions over various prior art catalysts. The factors compared are: (1) the average catalyst temperature necessary to give said substantially constant 50 to 55% per-pass conversion, which substantially constant conversion is indicated by the substantially constant product gravity shown; and (2) the catalyst fouling rate.

Catalyst C is an example of the catalyst of the present invention, while the other catalysts indicated are representative of various prior art catalysts.

From the above table it will be noted that: (1) as acidity increases, the product iso to normal ratio increases

TABLE I

| Cat. No. | Support | | Hydrogenating Component, Percent | | | | Area, m.²/g. | Av. Cat. Temp., °F. Necessary for Desired Conversion | Product Gravity | Fouling Rate |
|---|---|---|---|---|---|---|---|---|---|---|
| | $SiO_3$-$Al_2O_3$ | $SiO_2$-MgO | Ni | W | Mo | Pt | | | | |
| 1 | | 27% MgO | 7.0 | 19.3 | | | 316 | 759 | 40.0 | None observable.[1] |
| 2 | | 27% MgO | 4.9 | | 22.8 | | 254 | 755 | 40.3 | Do.[1] |
| 3 | | 27% MgO | 5.0 | | 5.0 | | | 756 | 39.9 | Moderate.[2] |
| 4 | | 27% MgO | 5.0 | 1.8 | | | | 767 | 39.5 | Do.[2] |
| 5 | | 27% MgO | | 8.5 | | | 437 | 790 | 39.5 | High.[3] |
| 6 | | 27% MgO | 9.0 | | | | 445 | 765 | 40.3 | Very high.[4] |
| 7 | | 27% MgO | | | | 0.5 | | 845 | 38.5 | Do.[4] |
| 8 | 25% $Al_2O_3$ | | 4.5 | 12.2 | | | 134 | 790 | 40.3 | None observable.[1] |
| 9 | 28% $Al_2O_3$ | | 3.9 | 10.4 | | | 130 | 792 | 40.0 | Moderate.[2] |
| 10 | 47% $Al_2O_3$ | | 5.0 | 7.0 | | | | 780 | 40.0 | Do.[2] |
| 11 | 47% $Al_2O_3$ | | 4.4 | | 9.4 | | 92 | 790 | 39.8 | Do.[2] |
| 12 | 10% $Al_2O_3$ | | | 18.0 | | | 116 | 805 | 39.8 | High.[3] |

[1] <0.05° F. per hour.  [2] ~0.10-0.15° F. per hour.  [3] ~0.5° F. per hour.  [4] 1.0° F. per hour.

From the above table, it will be noted that only catalysts 1 to 4 resulted in *both*: (1) the desired conversion rate at a reasonably low average catalyst temperature, in each case 767° F. or below, *and* (2) a reasonably low catalyst fouling rate, in each case moderate, as defined, or less. It will be noted that the catalysts 5 to 7, each having one hydrogenating component only, on a silica-magnesia support, resulted in an excessive catalyst fouling rate, i.e., one that was high, as defined, or higher. It will be noted that catalysts 8 to 12, each having a silica-alumina support rather than the silica-magnesia support of the catalyst of the present invention, resulted in the desired conversion being obtained only at an unreasonably high average catalyst temperature, in each case 780° F. or above.

COMPARISON OF CATALYST OF PRESENT INVENTION WITH CONVENTIONAL CATALYSTS RE ACIDITY, STARTING TEMPERATURE, ISO TO NORMAL $C_4$ PRODUCT RATIO, MIDDLE DISTILLATE TO GASOLINE PRODUCT RATIO AND NORMAL PARAFFIN CONTENT OF UNCONVERTED BOTTOMS

The following table sets forth on a comparative basis single-stage hydrocracking results of processing an Arabian straight run feed, at 0.5 LHSV, 2000 p.s.i.a., 60% per-pass conversion to products boiling below the initial boiling point of the feed, and extinction recycle, over the catalyst of the present invention, compared with hydrocracking the same feed under the same conditions over various prior art catalysts. The factors compared are: (1) starting temperature necessary to give said 60% per-pass conversion; (2) the ratio of $iC_4$ to $nC_4$ in the product; (3) the ratio of 400° to 650° F. product to $C_5$ to 400° F. product, i.e., the ratio of middle distillate production to gasoline production; (4) the hydrogen consumption, in s.c.f. per barrel of feed; and (5) the change, in ° F., of the pour point of the same bottoms fraction in each case, from the pour point of the feed, as an indication of the effect of the reaction in each case on normal paraffins in the system.

smoothly, except in the case of the catalyst of the present invention, with which is obtained a higher ratio than would be expected from inspection of the prior art catalysts alone; (2) as acidity increases, the product middle distillate to gasoline ratio decreases, but remains as high with the catalyst of the present invention as with catalysts of weaker acidity, which is entirely unexpected; heretofore, it has been believed that a catalyst of higher acidity would produce less middle distillate per unit of gasoline production than a more weakly acidic catalyst; (3) as acidity increases, hydrogen consumption increases smoothly, except in the case of the catalyst of the present invention, with which is obtained a higher hydrogen consumption and improved product quality; (4) as acidity increases, the normal paraffin content of the unconverted bottoms material, as indicated by the ° F. change in bottoms pour point from the pour point of the feed, decreases and then increases; with Catalysts A and E the bottoms material is indicated to have a greater normal paraffin content than the feed. With Catalysts B, C and D the unconverted bottoms material is less paraffinic than the feed, which is extremely desirable because normal paraffins are refractory to hydrocracking and therefore build up in recycle bottoms during recycle operation. A build-up of refractory normal paraffins can effectively prevent the practical use of recycle hydrocracking to produce middle distillates, because prohibitive temperature and pressure increases can be required to crack these refractory compounds; (5) with Catalysts B, C and D the undesirable refractory normal paraffins are selectively cracked and/or are isomerized to valuable isoparaffins, to an extent adequate to permit satisfactory recycle operation.

COMPARISON OF CATALYST OF PRESENT INVENTION WITH CATALYST HAVING SILICA-ALUMINA SUPPORT RE PRODUCTION OF MIDDLE DISTILLATES

The following table further indicates the specificity of the catalyst of the present invention for the production of middle distillates from various hydrocarbon feeds,

TABLE II

| Cat. | Cat. Comp. | Start T., °F. | $iC_4/nC_4$ | 400-650° F./ $C_5$-400° F. | $H_2$, s.c.f./ bbl. | Bottoms Pour Point Change, °F. |
|---|---|---|---|---|---|---|
| A | 6% Ni+22% Mo on $Al_2O_3$ | 850 | 0.2 | 1.4 | 1,300 | +13 |
| B | NiMo on $SiO_2$-$Al_2O_3$, 30% $SiO_2$ | 765 | 0.6 | 1.4 | 1,700 | −38 |
| C | NiW on $SiO_2$-MgO, 27% MgO | 720 | 1.1 | 1.4 | 2,000 | −25 |
| D | NiMo on $SiO_2$-$Al_2O_3$, 90% $SiO_2$ | 790 | 0.6 | 0.9 | 1,800 | −15 |
| E | 6% Ni on $SiO_2$-$Al_2O_3$, 99% $SiO_2$ | 740 | 1.1 | 0.4 | 2,600 | +19 |

The catalysts in the above table are set forth in order of increasing acidities, with Catalyst A having the lowest acidity and Catalyst E having the highest acidity.

compared with a catalyst having a silica-alumina support. In this case, the feed is a 650° to 820° F. hydrofined Midway gas oil, containing 3.6 p.p.m. total nitrogen.

It is hydrocracked at 0.77 LHSV, 1500 p.s.i.g. and a hydrogen rate of 5000 s.c.f. per barrel of feed, over each of the two catalysts, with the results indicated:

TABLE III

| Catalyst | Temp., °F. | Total Conversion to Products Boiling Below 650° F. | Percent of Product in 400-650° F. Boiling Range |
|---|---|---|---|
| NiW on SiO$_2$-Al$_2$O$_3$ | 650 | 53.2 | 41 |
| NiW on SiO$_2$-MgO | 650 | 53.4 | 49 |

REGENERABILITY OF CATALYST OF PRESENT INVENTION AND REGENERATED CATALYST ACTIVITY

The following table illustrates the regenerability of the preferred nickel-tungsten in silica-magnesia catalyst of the present invention. A catalyst comprising 7.0% nickel and 19.3% tungsten on a silica-magnesia support containing 27.7% magnesia, with an area of 316 m.$^2$/g., was placed in hydrocracking reactor and contacted for 120 hours at 2000 p.s.i.g., 1.0 LHSV, 759° F. average catalyst temperature, and hydrogen rate of 5500 s.c.f. per barrel of feed, with a hydrocarbon feed boiling from 650° to 982° F., said feed having a gravity of 23.5° API, an aniline point of 178.9° F., a pour point of +90 ASTM and a total nitrogen content of 665 p.p.m. The catalyst under these conditions converted 54 weight percent of the feed to products boiling below the 650° F. initial boiling point of the feed, and the gravity of the total products produced was 40.3° API.

After the foregoing on-stream period the catalyst was regenerated in a nitrogen-oxygen stream, at a reactor pressure of 600 p.s.i.g. and a gas rate of 20 cubic feet per hour, for a total period of 20 hours. During this period, the temperature was slowly raised from 500° to 900° F., and the oxygen content of the gas was raised from 0.1 to 4.0 volume percent.

The regenerated catalyst, having an area of 237 m.$^2$/g., was then used to hydrocrack the same feed that it had been used to hydrocrack prior to regeneration, under the same conditions. The activity of the regenerated catalyst was substantially equal to its original fresh activity, as indicated by its conversion, at an average catalyst temperature of 750° F., of 48 weight percent of the feed to products boiling below the initial boiling point of the feed, the total products produced having a gravity of 38.8° API.

The following summarizes the foregoing results:

TABLE IV

| | Area, m.$^2$/g. | Average Cat. Temp., °F. | Whole Product Gravity | Weight Percent Conversion to Products Boiling Below 650° F. |
|---|---|---|---|---|
| Fresh Catalyst | 316 | 759 | 40.3 | 54 |
| Regenerated Catalyst | 237 | 750 | 38.8 | 48 |

COMPARISON OF CATALYST OF PRESENT INVENTION WITH CONVENTIONAL CATALYSTS RE DENITRIFICATION ABILITY, NITROGEN SENSITIVITY AND ABILITY TO CONVERT NITROGEN-CONTAINING FEEDS TO MIDDLE DISTILLATES

The following table indicates results obtainable with the catalyst of the present invention and with a low acidity prior art catalyst, and a high acidity prior art catalyst, respectively, when used to hydrocrack a 650° to 1000° F. hydrocarbon feed at the indicated temperatures, and at 1.0 LHSV, 2000 p.s.i.g. and a hydrogen rate of 6500 s.c.f. per barrel, with extinction recycle of unconverted products. The indicated low nitrogen feeds refer to feeds containing from zero to 10 p.p.m. nitrogen and the indicated high nitrogen feeds refer to feeds containing above 10 p.p.m. nitrogen, for example 10 to 1000 p.p.m. nitrogen.

TABLE V

| | NiW on SiO$_2$-MgO, 27% MgO | 6% Ni+22% Mo on Al$_2$O$_3$ | 6% Ni on SiO$_2$-Al$_2$O$_3$, 90% SiO$_2$ |
|---|---|---|---|
| Temperature, in ° F. for 50% conversion with low N feeds | 650 | 850 | 550 |
| Temperature in ° F. for 50% conversion with high N feeds | 740 | 850 | 760 |
| Maximum yield of 320-650° F. middle distillate, with high N feed, percent | 75-85 | 75-85 | 55-65 |
| iC$_4$/nC$_4$ product ratio | high | low | high |
| Pour point of synthetic middle distillate product, °F | −40 | −20 | −60 |
| Relative denitrification activity | 1.3 | 1.0 | 0.1 |
| Sensitivity to S | nil | nil | nil |
| Sensitivity to N | low | nil | high |

Although only specific embodiments of the present invention have been described, numerous variations could be made in those embodiments without departing from the spirit of the invention, and all such variations that fall within the scope of the appended claims are intended to be embraced thereby.

We claim:
1. A process for converting a nitrogen-containing hydrocarbon feed selected from the group consisting of petroleum distillates boiling from 500° to 1100° F. and petroleum residua boiling above 500° F. which comprises concurrently hydrofining and hydrocracking said feed by contacting said feed in a first stage in the presence of from 1000 to 10,000 s.c.f. of hydrogen per barrel of said feed and in the presence of a catalyst comprising at least one hydrogenating component selected from the group consisting of Group VI metals and compounds thereof and at least one hydrogenating component selected from the group consisting of Group VIII metals and compounds thereof and a silica-magnesia catalyst support at a temperature of 500° to 950° F., a hydrogen partial pressure from 1000 to 2500 p.s.i.g. and an LHSV of from 0.1 to 4.0, withdrawing from the effluent from said first stage a gasoline product and ammonia, and hydrocracking in a second stage in the presence of an active acidic hydrocracking catalyst at least a substantial portion of the liquid effluent from said first stage, to produce additional quantities of gasoline having a high ratio of isoparaffins to normal paraffins.

2. A process as in claim 1, wherein said active acidic hydrocracking catalyst in said second stage is selected from the group consisting of nickel-tungsten on silica-magnesia and nickel sulfide on silica-alumina.

3. A process as in claim 1, wherein said portion of said liquid effluent from said first stage is first treated by hydrofining before being hydrocracked in said second stage.

4. A process as in claim 3, wherein said hydrofining is accomplished with a catalyst selected from the group consisting of nickel-tungsten on silica-magnesia and nickel-molybdenum on alumina.

5. A process for converting a nitrogen-containing hydrocarbon feed selected from the group consisting of petroleum distillates boiling from 500° to 1100° F. and petroleum residua boiling above 500° F. which comprises contacting said feed in a first stage in the presence of from 1000 to 10,000 s.c.f. of hydrogen per barrel of said feed and in the presence of a catalyst comprising at least one hydrogenating component selected from the group consisting of Group VI metals and compounds thereof and at least one hydrogenating component selected from the Group VIII metals and compounds thereof and a silica-magnesia support at a temperature of from 500° to 950° F., a hydrogen partial pressure from 1000 to 2500 p.s.i.g. and an LHSV of from 0.1 to 4.0, recovering a gasoline product from said first stage, and catalytically cracking in a second stage in the presence of a conventional catalytic cracking catalyst at least a substantial portion of the liquid effluent from said first stage, to produce additional quantities of gasoline.

6. A process as in claim 5, wherein at least a substantial portion of the liquid effluent from said catalytic cracking stage is treated, under reforming conditions, in a reforming zone in the presence of a conventional reforming catalyst to produce a high octane gasoline.

References Cited by the Examiner
UNITED STATES PATENTS

| | | | |
|---|---|---|---|
| 2,952,611 | 9/60 | Haxton et al. | 208—65 |
| 3,008,895 | 11/61 | Hansford et al. | 208—112 |
| 3,026,260 | 3/62 | Watkins | 208—59 |
| 3,043,769 | 7/62 | Nathan et al. | 208—112 |
| 3,047,490 | 7/62 | Myers | 208—59 |
| 3,062,735 | 11/62 | Donaldson et al. | 208—111 |
| 3,072,560 | 1/63 | Paterson et al. | 208—88 |
| 3,132,087 | 5/64 | Kelley et al. | 208—60 |
| 3,132,090 | 5/64 | Helfrey et al. | 208—111 |

ALPHONSO D. SULLIVAN, *Primary Examiner.*

UNITED STATES PATENT OFFICE
CERTIFICATE OF CORRECTION

Patent No. 3,172,838                                        March 9, 1965

Harold F. Mason et al.

It is hereby certified that error appears in the above numbered patent requiring correction and that the said Letters Patent should read as corrected below.

Column 3, line 74, for "monosynthetic" read -- non-synthetic --; column 6, line 38, for "Group IV" read -- Group VI --; columns 9 and 10, TABLE II, under the heading "Cat. Comp." last line thereof, for "99%" read -- 90% --.

Signed and sealed this 3rd day of August 1965.

(SEAL)
Attest:

ERNEST W. SWIDER
Attesting Officer

EDWARD J. BRENNER
Commissioner of Patents